HELICAL SCAN RECORDER WITH TAPERED DRUM TO PREVENT OXIDE BUILD-UP

Filed Dec. 27, 1966

INVENTORS
JAMES E. QUINN
DELMAR R. JOHNSON

BY Anderson, Luedeka, Fitch, Even & Tabin ATTORNEYS

3,436,491
HELICAL SCAN RECORDER WITH TAPERED DRUM TO PREVENT OXIDE BUILD-UP

James E. Quinn, Wilmette, and Delmar R. Johnson, Des Plaines, Ill., assignors to Ampex Corporation, Redwood City, Calif., a corporation of California

Filed Dec. 27, 1966, Ser. No. 604,833
Int. Cl. G11b *5/30*
U.S. Cl. 179—100.2 5 Claims

This invention relates to magnetic tape recording and reproducing apparatus and, more particularly, to an improved air bearing, helical scanning assembly for use in a magnetic tape recording and reproducing apparatus.

A tape transport for use in magnetic tape recording or reproducing apparatus generally includes a tape deck and supply and takeup reels, which store the magnetic tape, rotatably supported on the tape deck. The tape is guided between the supply and takeup reels by an arrangement of guides and/or cylinders and over a scanning assembly, all mounted on the tape deck. A rotating capstan operates to drive the tape at a predetermined speed between the supply and takeup reels. The scanning assembly generally includes one or more transducing heads which operate to translate electrical signals to magnetic variations for storage on the tape during the record operation or which operate to translate magnetic signals from the tape into the original signal during the reproduce operation.

In the recording of relatively broad band frequency signals on magnetic tape and the subsequent reproduction of the signals from the tape, a helical wrap type of scanning assembly is often used on lower cost recorders. Basically, such a scanning assembly includes a pair of cylindrical drums which are axially spaced to define an annular gap therebetween. Magnetic tape is wrapped helically about the drums and is moved over the drums in the direction of its length between the tape supply and takeup reels by the capstan. One or more transducer heads are rotated in the gap between the drums and sweep a rectilinear area of tape, such rectilinear area extending at an acute angle across the tape. As a result relatively long tracks are spaced successively along the tape and extend at acute angles to the edges thereof. In the recording and playback of television signals, an entire field or, in some instances, an entire frame may be included in one of the relatively long tracks.

It has been found that a tape path wherein the tape is wrapped substantially 360° in helical fashion about the scanning assembly provides certain advantages. One of the major advantages provided by such a wrap is the fact that only a single transducing head need be utilized. In one type of 360° wrap known as the Omega wrap, the tape approaches and leaves the surface of the scanning assembly at approximately the same point and forms accordingly a loop approximation of the Greek letter capital Omega. The Omega type wrap is not a full 360° but by proper circuit design and other compensations, the effect of the slight drop-out space between the approaching and leaving paths of the tape are negligible. In this connection, the rotation of the head is synchronized during record so that the drop-out is located at a non-objectionable point in the video information. For example, typically the drop-out is placed at the bottom of the picture just before the vertical blanking interval or at the back porch of the vertical blanking interval.

One problem with the 360° wrap is that the friction between the tape and scanning assembly makes it difficult, if not impossible, to pull the tape around the scanning assembly. Also, it is inherent that there is a considerable increase in tape tension between the input tape tension to the scanning assembly and the output tape tension. For average coefficients of friction, the output tape tension will be approximately three and one-half times the input tape tension. These problems of tape tension may be avoided by providing an air bearing for the tape thereby lubricating the tape as it passes about the scanning assembly. This air bearing may be generated by rotating one of the drums while maintaining the other drum stationary. Recorders employing such a scanning assembly are the VR 7000 and the VR 6000 series recorders manufactured and sold by Ampex Corporation, the assignee of this application.

Certain of these recorders, after a relatively short period of use in the field, reproduced unacceptable pictures. For example, the playback pictures exhibited vertical instability, high frequency flutter, evidence of poor tape tracking and bending at the top of the picture. Others of the recorders developed these problems after various periods of use. However, the problems did not occur with all recorders.

The recorders were investigated and it was found that there was a deposit on the lower edge of the rotating drum formed of material shed from the tape. In addition, it was noted that this deposit usually formed only when the surface of the rotating drum extended beyond the surface of the fixed drum, a condition which could result from a rotating drum whose diameter was larger than that of the fixed drum or by the two drum outer diameters not being concentric.

When oxide deposits are present on the rotating drum, the tape drag on the rotating drum increases significantly. While normally the tape drag on the rotating drum is relatively low (i.e., approximately about 1 to 2 inch-ounces) this drag becomes quite high (i.e., on the order of 10 inch-ounces) when oxide deposits are present.

It is primarily on the first or second pass of a new reel of tape (when shed from the tape is the greatest) that significantly higher than normal drum drag occurs. Usually, the drum drag increases with time as the new reel of tape is run through the recorder (the deposit builds up with time). This increasing drum drag causes a lag in the angular position of the recording head relative to the signal information during the recording mode. In the case of a video recorder, the increased drum drag causes the position of the dropout to lag relative to its normal position (i.e., just before the vertical blanking interval) and, when it becomes large enough, shifts the drop-out into the vertical sync information. When this happens, the reproduced picture develops the vertical instabilities previously referred to.

Also, when there is a high drag between the tape and drum, tape tracking is affected. The drum drag force on the tape tends to lift the tape off a tape guide disposed at the rear of the drum, thus causing during playback, tracking instability and, in extreme cases, even cross tracking. It is to be noted that imperfect tracking causes noise to appear in the playback picture and crosstracking causes discontinuities to appear in the playback picture. Moreover, high drag between the tape and drum causes the previously referred to high frequency flutter in the reproduced picture, and causes differential tension in the tape around the scanning assembly. This differential tension in a video recorder causes the bend in the top of the reproduced picture which was previously referred to.

An object of the present invention is the provision of an improved air bearing scanning assembly for a helical scan recorder. Another object is the provision of an air bearing helical scanning assembly wherein drag caused by oxide shed from the tape is minimized. Still another object is the provision of a scanning assembly in which an upper drum assembly is rotated and is provided with means for preventing the accumulation of oxide thereon during use.

Other objects and advantages of the present invention will become apparent by reference to the following description and accompanying drawings.

Figure 1:
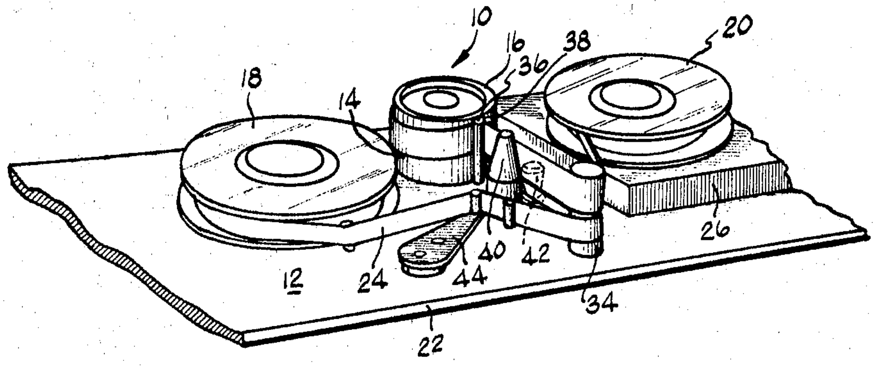
FIGURE 1 is a fragmentary perspective view of a tape transport including a scanning assembly in accordance with the present invention.

Briefly, in accordance with the invention, a helical scanning assembly 10 is provided which is employed in a tape transport 12 of a magnetic tape recording and reproducing apparatus (not shown). The scanning assembly 10 includes a pair of substantially cylindrical, coaxial and closely spaced drums 14 and 16. One of the drums 14 and 16 is mounted for rotation relative to the other of the drums. The rotatable drum 16 is provided with an inwardly tapered outer diameter adjacent the other drum 14, which taper insures that the outer diameter of the edge of the rotatable drum 16 adjacent the other drum 14, is always smaller than the other drum. This prevents oxide deposits on the edge.

More particularly, the tape transport 12 shown in FIGURE 1, includes a supply reel 18 and a takeup reel 20 mounted for rotation upon a tape deck 22 at spaced positions thereon and which serve to store a magnetic tape 24. The supply reel 18 is mounted on the deck surface proper while the takeup reel 20 is mounted on a raised support portion 26 so as to be elevated with respect to the supply reel 18, for purposes subsequently described. The supply reel 18 and takeup reel 20 are coupled to electric drive motors (not shown) in a conventional manner. The motors are arranged to maintain tape tension and to wind up the tape 24 on the takeup reel 20 during record or reproduce operations.

The length of the tape extending between the reels 18 and 20 is wrapped helically about the coaxial and closely spaced drums 14 and 16 which comprise the scanning assembly 10. The lower drum 14 is fixedly supported on the tape deck 22 and the upper drum 16 is mounted for rotation, and is rotated at a very high speed, for example, 3600 r.p.m. by a drive motor 28 (FIGURE 2) supported by the tape deck 22. A magnetic transducing head 30 is mounted at the lower edge of the upper drum 16, and has a tip which extends outwardly of the drum at the gap 32 between the drums 14 and 16.

In order to facilitate driving and guidance of the tape 24 helically about the scanning assembly 10, a rotatable capstan 34 is mounted on the deck 22 in forwardly spaced parallel relationship to the scanning assembly 10. Cylindrical entrance and exit guide posts 36 and 38 which are parallel to the axis of the drums 14 and 16 are mounted on the deck 22 close to the periphery of the drums 14 and 16 and on opposite sides of a line extending between the drums and the capstan axis. In addition, a pair of spindles 40 and 42 are mounted on the deck 22 on opposite sides of the line between the capstan and drum axes at points between the capstan 34 and the posts 36 and 38.

As shown in FIGURE 1, the tape 24 leaving the supply reel 18 is engaged by a tape tension arm 44, extends around the lower portion of the captsan 34, about a downwardly tapered lower half of the right hand spindle 42, through the gap between the posts 36 and 38, around the entrance post 38 and tangentially upon the lower cylindrical drum 16 of the scanning assembly 10. By virtue of the shape of the spindle 42, the tape 24 is twisted slightly to slant the lower edge thereof outwardly from the line between the capstan and the drum axes. This twist causes the tape 24 entering the scanning assembly 10 to traverse an upward path as it extends about 360° around the drums to the exit post 36. The tape 24 thus extends about the scanning assembly 10 in a helical wrap. The taper of the spindle 42 is selected, moreover, to impart a pitch to the helical wrap which positions substantially the entire width of the tape over the upper drum 16 at a point adjacent the exit post 36. The tape then tangentially leaves the upper drum 16 to extend around the exit post 36, and through the gap between the posts 36 and 38.

The exiting tape extends around an upwardly tapered upper half of the spindle 40, around the upper portion of the capstan 34 and on to the takeup reel 20. A twist is applied to the tape 24 as it extends about the upper half of the spindle 38. The taper of the upper half of the spindle 38 is equal, but opposite, to that of the lower half of the entry spindle 42 such that the tape 24 is twisted to slant the upper edge thereof outwardly from a line between the drum and capstan axes by an amount equal to the outward slant of the lower edge arising from the original twist affecting the helical wrap. Thus, the exiting tape is returned to a path lying in a plane parallel to the deck 22 before it reaches the capstan 34 such that the tape extends uniformly about the captsan and is directed uniformly tangentially upon the takeup reel 20 without kinking or twisting. As previously noted, by virtue of the helical wrap, the tape rises in passing around the drums and it is for this reason that the takeup reel 20 is mounted in elevated position on the raised portion 26 of the tape deck 22.

Although the guidance arrangement of the tape transport 12 illustrated in the drawings and herein described is such as to provide an Omega helical wrap about the scanning assembly, it is to be noted that this specific form of wrap is purely exemplary and that other helical wraps extending 360° or more or substantially less than 360° may be employed with the invention by appropriate modification of the tape guidance system. A 180° wrap may, for example, be employed with two heads mounted at diametrically opposed points of a head drum.

Figure 2:
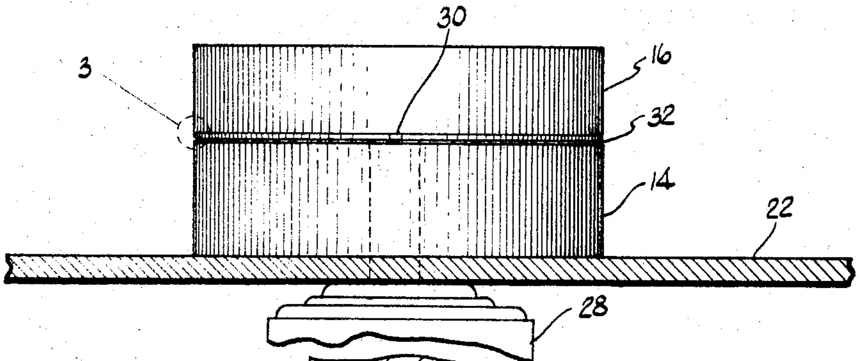
FIGURE 2 is an enlarged cross sectional view of the helical scanning assembly of FIGURE 1 without showing the magnetic tape.
Figure 3:
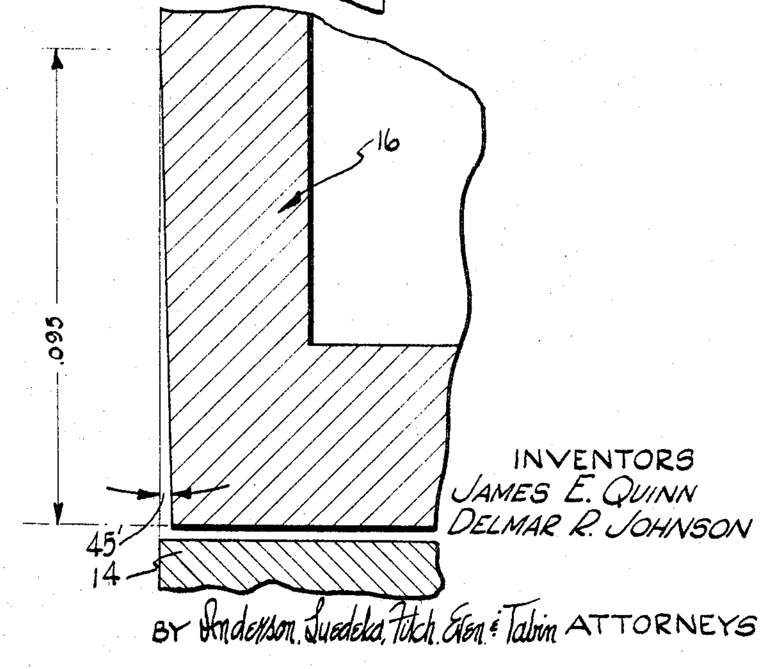
FIGURE 3 is an enlarged cross sectional view of a portion of FIGURE 2.

Referring now more particularly to FIGURES 2 and 3, the details of the scanning assembly of the invention may be more clearly seen. Normally, during production, attempts are made to make the upper and lower drums with the same outer diameter. However, this is not practical and scanning assemblies are built in which the upper drum is larger in outer diameter than the lower drum. If the upper drum is larger than the lower drum, then its lower edge is an area of higher than normal contact pressure with the tape. Shed material from the tape is most prone to form deposits where such conditions exist.

To ensure that the lower edge of the upper drum is always smaller in diameter than the lower drum, to thereby prevent oxide deposit thereon, the lower portion of the upper or rotating drum 16 is provided with a slight inward taper. The taper is made sufficient so that the lower edge of the rotating drum is always smaller in diameter than the outer diameter of the lower fixed drum. Preferably, the outer diameter of the edge is reduced by an amount slightly greater than the total tolerance used in manufacturing the drums. For example, the normal manufacturing tolerance on the drum is plus or minus .001 inch and for this tolerance the lower edge is made approximately .0025 inch less than the normal diameter of the drum.

Preferably, the length of the taper is not made too great, because tape tracking becomes unstable near the trailing edge of the recording. It has been found, for an Omega wrap scanning assembly, that if the length of the taper is less than about 10 percent of the width of the tape, the effect on tracking is negligible. For example, in a one headed recorder employing a one inch tape and a .0025 inch reduction in the diameter of the lower edge, this tracking instability occurs when the taper angle is one half of a degree, the lower .140 inch of the drum being tapered. By increasing the taper to 45 minutes, the length of the taper being .095 inch, the effect on tracking is negligible.

Tests were run on recorders which previously exhibited high drum drag up to 10 inch-ounces and which were modified by machining the above specified taper on the upper drum. After running two 1-hour reels of a new tape through each recorder, the drum drags were no greater than 3 inch-ounces. Also, there was a significant improvement in the time base stability of the drum tach pulses.

Thus it can be seen from the above, an improved air bearing type helical scanning assembly is provided in which the effects of oxide shed on the rotating drum are minimized. Also, the operating characteristics of the scanning assembly are not affected by the use of various types of tape. The improved scanning assembly provides a recorder which has a higher stability of reproduced picture and reduces other ditsortions which are caused by variance in the synchronization of the transducing head with respect to the recorded track.

Various changes and modifications may be made in the above described scanning assembly without deviating from the spirit or scope of the present invention. Various features of the invention are set forth in the accompanying claims.

What is claimed is:

1. A helical scanning assembly for use in magnetic tape recording and reproducing apparatus comprising a pair of substantially cylindrical, coaxial and closely spaced drums, and means for mounting one of said drums for rotation with respect to the other of said drums, said rotatable drum having an outer diameter with an inward taper in the direction of the other of said drums with said taper continuously extending to the edge of said rotating drum adjacent the other drum, whereby the outer diameter of the edge of the rotatable drum adjacent the other drum is less than the outer diameter of the other drum.

2. A helical scanning assembly in accordance with claim 1, in which at least one transducing head is attached to the rotatable drum and extends outwardly between the drums.

3. A helical scanning assembly in accordance with claim 1 wherein the taper is such that the edge of the rotatable drum has an outer diameter which is smaller than the normal outer diameter by an amount slightly greater than the manufacturing tolerance used in making the rotating drum.

4. A helical scanning assembly in accordance with claim 2 wherein the taper angle is such that the length of the taper is less than about 10 percent of the width of the magnetic tape employed with the scanning assembly.

5. In a helical scan type of magnetic tape apparatus having a tape deck, a pair of cylindrical drums mounted in closely spaced, coaxial relationship upon said deck, the lower drum being fixedly mounted and the upper drum being rotatably mounted, a transducing head attached to the upper drum and having a tip which extends outwardly of the lower edge of said upper drum, said upper drum having an outer diameter with an inward taper in the direction of the other drum with said taper continuously extending to the edge of said upper drum adjacent the lower drum, whereby the outer diameter of the edge of the rotatable drum adjacent the other drum is less than the outer diameter of the other drum.

References Cited

UNITED STATES PATENTS 3,333,753 8/1967 Streets ---------- 179—100.2 X

BERNARD KONICK, *Primary Examiner.*

R. S. TUPPER, *Assistant Examiner.*